(12) United States Patent
Mihailov et al.

(10) Patent No.: US 6,993,221 B2
(45) Date of Patent: Jan. 31, 2006

(54) BRAGG GRATING AND METHOD OF PRODUCING A BRAGG GRATING USING AN ULTRAFAST LASER

(75) Inventors: Stephen J. Mihailov, Kanata (CA); Christopher W. Smelser, Ottawa (CA); Ping Lu, Ottawa (CA); Robert B. Walker, Spencerville (CA); Dan Grobnic, Ottawa (CA); Huimin Ding, Nepean (CA); George Henderson, Ottawa (CA); Xiaoli Dai, Ottawa (CA)

(73) Assignee: Her Majesty the Queen in right of Canada, as represented by the Minister of Industry, Ottawa (CA)

( * ) Notice: Subject to any disclaimer, the term of this patent is extended or adjusted under 35 U.S.C. 154(b) by 129 days.

(21) Appl. No.: 10/639,486

(22) Filed: Aug. 13, 2003

(65) Prior Publication Data

US 2004/0184731 A1 Sep. 23, 2004

Related U.S. Application Data

(60) Provisional application No. 60/456,184, filed on Mar. 21, 2003.

(51) Int. Cl.
*G02B 6/34* (2006.01)
(52) U.S. Cl. .................................................. 385/37
(58) Field of Classification Search .............. 385/37, 385/124, 141, 123
See application file for complete search history.

(56) References Cited

U.S. PATENT DOCUMENTS

| | | | |
|---|---|---|---|
| 4,807,950 A | 2/1989 | Glenn et al. | |
| 5,104,209 A | 4/1992 | Hill et al. | |
| 5,287,427 A | 2/1994 | Atkins et al. | |
| 5,363,239 A * | 11/1994 | Mizrahi et al. | ............. 359/570 |
| 5,367,588 A | 11/1994 | Hill et al. | |
| 5,400,422 A | 3/1995 | Askins et al. | |
| 5,495,548 A | 2/1996 | Bilodeau et al. | |
| 5,579,427 A * | 11/1996 | Rusanov et al. | ............ 385/124 |
| 5,620,496 A | 4/1997 | Erdogan et al. | |
| 5,647,039 A * | 7/1997 | Judkins et al. | ................ 385/37 |
| 5,978,538 A | 11/1999 | Miura et al. | |
| 6,050,109 A | 4/2000 | Kosinski et al. | |
| 6,112,553 A * | 9/2000 | Poignant et al. | ................ 65/41 |
| 6,204,926 B1 | 3/2001 | Maznev et al. | |
| 6,208,787 B1 | 3/2001 | Tam | |
| 6,297,894 B1 | 10/2001 | Miller et al. | |
| 6,347,171 B1 * | 2/2002 | Tatah et al. | ................... 385/37 |

(Continued)

FOREIGN PATENT DOCUMENTS

GB    2 281 787 A    3/1995

OTHER PUBLICATIONS

A Laurin Web site, The photonics Directory, definition of "Ultrashort-pulse laser".*

(Continued)

*Primary Examiner*—Ellen E. Kim
(74) *Attorney, Agent, or Firm*—Freedman & Associates (57) ABSTRACT

A novel method and apparatus for varying the index of refraction of a material using an interference pattern is disclosed. The method and apparatus incorporate an ultra short duration pulse laser source. Electromagnetic radiation provided from the laser propagates to a diffractive element positioned in close proximity to the target material. The diffracted electromagnetic radiation forms an interference pattern, the peaks of which are sufficiently intense to cause a change in index of refraction.

14 Claims, 7 Drawing Sheets

U.S. PATENT DOCUMENTS

| | | | |
|---|---|---|---|
| 6,404,956 B1 * | 6/2002 | Brennan et al. | 385/37 |
| 6,456,762 B1 * | 9/2002 | Nishiki et al. | 385/37 |
| 6,768,850 B2 * | 7/2004 | Dugan et al. | 385/124 |
| 6,836,592 B2 * | 12/2004 | Mead et al. | 385/37 |
| 2002/0126333 A1 | 9/2002 | Hosono et al. | |
| 2003/0035640 A1 | 2/2003 | Dugan et al. | |

OTHER PUBLICATIONS

Davis et al., "Writing waveguides in glass with a femtosecond laser", OPTICS LETTERS, Optical Society of America, vol. 21, No. 21, Nov. 1, 1996.

Fertein et al., "Refractive-index changes of standard telecommunication fiber through exposure to femtosecond laser pulses at 810 cm", Applied Optics, vol. 40, No. 21, Jul. 20, 2001.

Kawamura et al., "Holographic encoding of fine-pitched micrograting structures in amorphous $SiO_2$ thin films on silicon by a single femtosecond laser pulse", APPLIED PHYSICS LETTERS, American Institute of Physics, vol. 78, No. 8, Feb. 19, 2001.

Maznev et al., "How to make femtosecond pulses overlap" OPTICS LETTERS, Optical Society of America, vol. 23, No. 17, Sep. 1, 1998.

* cited by examiner

BRAGG GRATING AND METHOD OF PRODUCING A BRAGG GRATING USING AN ULTRAFAST LASER

This application claims the benefit of U.S. Provisional Application No. 60/456,184 filed Mar. 21, 2003.

FIELD OF THE INVENTION

This invention relates generally to a method and system for inducing a refractive index change into optical media such as optical fibers and waveguides, and particularly to a method of fabricating Bragg gratings therein.

BACKGROUND OF THE INVENTION

The fabrication of many photonic devices has been achieved through exposure of transmissive and absorbing materials to intense laser radiation in order to change the optical properties of said materials. For example, UV-induced photosensitivity of germanium doped silica glasses has been exploited in order to create permanent refractive index changes in the photosensitive Ge-doped silica cores of single mode optical fibers and waveguides as opposed to the undoped cladding. By creating a spatial intensity modulation of the UV exposure either by using a two-beam interference technique as disclosed in U.S. Pat. No. 4,807,950 by Glenn et al. or by using a phase mask as disclosed in U.S. Pat. No. 5,367,588 by Hill et al., Bragg grating structures can be produced in the photosensitive core of the waveguide.

As disclosed by Glenn et al., permanent periodic gratings are provided or impressed into the core of an optical fiber by exposing the core through the cladding to the interference fringe pattern generated by two coherent beams of ultraviolet laser light that are directed against the optical fiber symmetrically to a plane normal to the fiber axis. The material in the fiber core is exposed to the resultant interference fringe intensity pattern created by the two overlapping UV beams creating permanent periodic variations in the refractive index along the length of the UV photosensitive core of the waveguide. The resultant index variations are oriented normal to the waveguide axis so as to form the Bragg grating.

A more popular method of photo imprinting Bragg gratings is taught by Hill et al. in U.S. Pat. No. 5,367,588 where an interference fringe pattern is generated by impinging a single UV light beam onto a transmissive diffractive optic known as a phase mask. The waveguide to be processed is placed immediately behind the phase mask and is exposed to the generated interference fringe pattern leading to the formation of the Bragg grating structure. In these prior art examples, optical fibers or waveguides having a Ge doped photosensitive core are irradiated with UV light at a predetermined intensity and for a predetermined duration of time sufficient to obtain a substantially permanent Bragg grating structure within the core of said waveguide.

These prior art gratings provide a useful function, however they suffer from some limitations in terms of the amount of induced index change that is possible. In order for some Bragg grating structures to be written in a standard telecommunications single mode optical fiber, the optical fiber often needs to be photosensitized to UV light by exposing such an optical fiber to hydrogen or deuterium gas at elevated pressures and temperatures as taught by Atkins et al. in U.S. Pat. No. 5,287,427 or by hydrogen flame brushing as taught be Bilodeau et al. in U.S. Pat. No. 5,495,548. After exposure, the UV written structures need to be annealed at elevated temperatures in order to remove any remaining interstitial hydrogen or deuterium present in the waveguide core. As taught by Erdogan et al. in U.S. Pat. No. 5,620,496, this annealing step is often implemented in order to stabilize by accelerated aging, the induced index change. These extra processing steps to the optical fiber or waveguide complicate the manufacturing of photonic devices and reduce yield.

Another method for creating permanent photoretractive index changes in glasses employs the use of intense UV beams with fluences or energy/unit-area per laser pulse densities that approach those required to produce macroscopic damage of the glass. Askins et al. in U.S. Pat. No. 5,400,422 teach a method for producing permanent photorefractive index changes in the photosensitive cores of Ge-doped optical fibers with single high intensity UV laser pulses. The high intensity portions of the interference fringes created by two crossed UV beams split from a single UV beam create localized damage at the core-cladding interface within the fiber. Because the process for inducing index change is one of structural change due to localized physical damage to the glass, rather than due to UV photoinduced color center formation, the induced index change is more robust and does not decrease with elevated temperature. Thus, annealing steps as taught by Erdogan et al. in U.S. Pat. No. 5,620,496 are not required. In fact Askins et al. disclose that gratings produced in this way cannot be removed by annealing until the fiber or waveguide approaches the material's glass transition temperature. The drawback of this approach for induction of index change is that the Bragg gratings produced in this fashion have relatively low refractive index modulations ($\Delta n=10^{-5}$) and are mechanically weak since the effective refractive index change results from periodic localized damage at the core-cladding interface. Since the damage mechanism is based on an intensity threshold process, the spectral quality of the resulting Bragg grating is often poor.

Recently processes that employ high-intensity laser pulses in the femtosecond pulse duration regime for creating permanent changes in the refractive indices of glasses have been explored by several groups of researchers. K. M. Davis et al. disclose a technique for inducing index change in bulk glasses with ultra-high peak power femtosecond infra-red radiation in Opt. Lett 21, 1729 (1996). The creation of waveguides in bulk glasses using this technique is taught by Miura et al. in U.S. Pat. No. 5,978,538 while the modification or trimming of existing waveguide structures is taught by Dugan et al. in U.S. patent application No. 20030035640. The physical process that appears to cause the refractive index change in the materials is due to the creation of free electrons through non-linear absorption and multi-photon ionization of bound charges, followed by avalanche ionization and localized dielectric breakdown as these free electrons are accelerated by the intense but short time duration laser field. Also, this leads to a localized melting and restructuring of the material and a concurrent increase in the index of refraction. Work performed in this field has used laser pulses that are tightly focused to near-diffraction limited spot sizes generating extremely high intensities of light, approximately $10^{14}$ W/cm$^2$, in order to initiate non-linear absorption processes in the materials. While this allows for high-resolution spatial localization of the refractive index change, it involves point-by-point scanning of the ultrashort-time-duration laser along the length of the optical fiber or waveguide as disclosed by Fertein et al. Appl. Opt. 40 (21), 3506 (2001). This is a great disadvantage for writing retroreflective Bragg grating structures but is suitable for writing long-period Bragg grating structures which, instead of coupling light from the forward-propagating guided mode into a retro-reflecting guided mode, couple light energy traveling along the fiber in a forward-propagating guided mode into light that propagates into forward-propagating cladding modes where the light is at least partially attenuated. There are several prior-art examples of long-period grating fabrication. The point-by-point writing method is taught by Hill et al. in U.S. Pat. No. 5,104,209 using a slit-amplitude mask. A variation on the amplitude mask technique is taught by Tam in U.S. Pat. No. 6,208,787 where a plano-convex array of cylindrical microlenses is used to focus portions of an incident UV beam onto on optical fiber. Another technique for fabrication of long-period fiber gratings with an electric arc is taught by Kosinski et al. in U.S. Pat. No. 6,050,109.

In order to photo imprint retroreflective Bragg structures into the core of optical fibers or waveguides using high-intensity femtosecond time duration radiation, it is advantageous to generate an interference fringe pattern originating from a single femtosecond laser pulse either using a holographic technique or a diffractive optic. Kawamura et al. in Appl. Phys. Lett. 78 (8), 1038 (2001) disclose an apparatus for producing a hologram using a two-beam laser interference exposure process, comprising the steps of using a femtosecond laser having a pulse width of 10 to 900 femtoseconds and a peak output of 1 GW or more that is capable of generating a pulse beam at or close to the Fourier transform limit. The beam from the laser is divided into two beams using a beam splitter, controlled temporally through an optical delay circuit and spatially using plane and concave mirrors each having a slightly rotatable reflection surface to converge the beams on a surface of or within a substrate for recording a hologram at an energy density of 100 $GW/cm^2$ or more with keeping each polarization plane of the two beams in parallel so as to match the converged spot of the two beams temporally and spatially, whereby a hologram is recorded irreversibly on the substrate formed of a transparent material, semiconductor material or metallic material. The volume hologram is optionally layered so as to provide a multiplex hologram recording that is permanent unless it is heated to a temperature to cause the structural change in the atomic arrangement of the substrate in which the hologram is inscribed. The authors teach this method in US Pat. Appl.20020126333.

Maznev et al. Opt. Lett. 23 (17), 1378 (1998) disclose a technique for generating interference fringes with femtosecond pulses by overlapping two femtosecond beams that originate from a single beam which passes through a diffractive optical element. This method is taught by the authors in U.S. Pat. No. 6,204,926. Miller et al., in U.S. Pat. No. 6,297,894, teach a similar method for utilizing a diffractive optic to generate an interference fringe pattern in order to induce refractive index changes in materials using femtosecond time duration laser radiation. An exemplary embodiment of the invention of Miller et al. comprises a femtosecond laser source for providing light to a diffractive optical element. Light propagating from the diffractive optical element is incident on a curved mirror, which acts to focus the light into a lens or another curved mirror and then into a target.

It is an objective of this invention to overcome the aforementioned limitations within the prior art systems of inducing refractive index change in optical fibers and waveguides using femtosecond time duration laser radiation. Additionally, it would be beneficial to provide a simple method of producing high quality FBGs that are robust and are not subject to annealing.

SUMMARY OF THE INVENTION

The invention provides a method for inducing a spatially modulated refractive index pattern in an optical waveguide, comprising:

providing an optical waveguide;

disposing a mask optically proximate the optical waveguide; and,     providing electromagnetic radiation on a surface of the mask, the electromagnetic radiation having a wavelength range, the electromagnetic radiation having a pulse duration of less than or equal to 500 picoseconds, the mask disposed to permit a portion of the electromagnetic radiation to interact with the mask and be incident on the optical waveguide, the interaction of the electromagnetic radiation with the mask for producing a spatial intensity modulation pattern within the optical waveguide, the electromagnetic radiation incident on the optical waveguide being sufficiently intense to cause a change in an index of refraction of the optical waveguide, the electromagnetic radiation interacting with the surface of the mask having a sufficiently low intensity to not significantly alter produced spatial intensity modulation properties of the mask.

The invention also provides a method for inducing a spatially modulated refractive index pattern in a photosensitive material, comprising:

providing a photosensitive material;

disposing a mask optically proximate the photosensitive; and,     providing electromagnetic radiation on a surface of the mask, the electromagnetic radiation having a wavelength range, the electromagnetic radiation having a pulse duration of less than or equal to 500 picoseconds, the mask disposed to permit a portion of the electromagnetic radiation to interact with the mask and be incident on the photosensitive material, the interaction of the electromagnetic radiation with the mask for producing a spatial intensity modulation pattern within the photosensitive material, the electromagnetic radiation incident on the photosensitive being sufficiently intense to cause a change in an index of refraction of the photosensitive material, the electromagnetic radiation interacting with the surface of the mask having a sufficiently low intensity to not significantly alter produced spatial intensity modulation properties of the mask.

BRIEF DESCRIPTION OF THE DRAWINGS

The invention is now described with reference to the drawings in which.

DETAILED DESCRIPTION OF THE INVENTION

Figure 1:
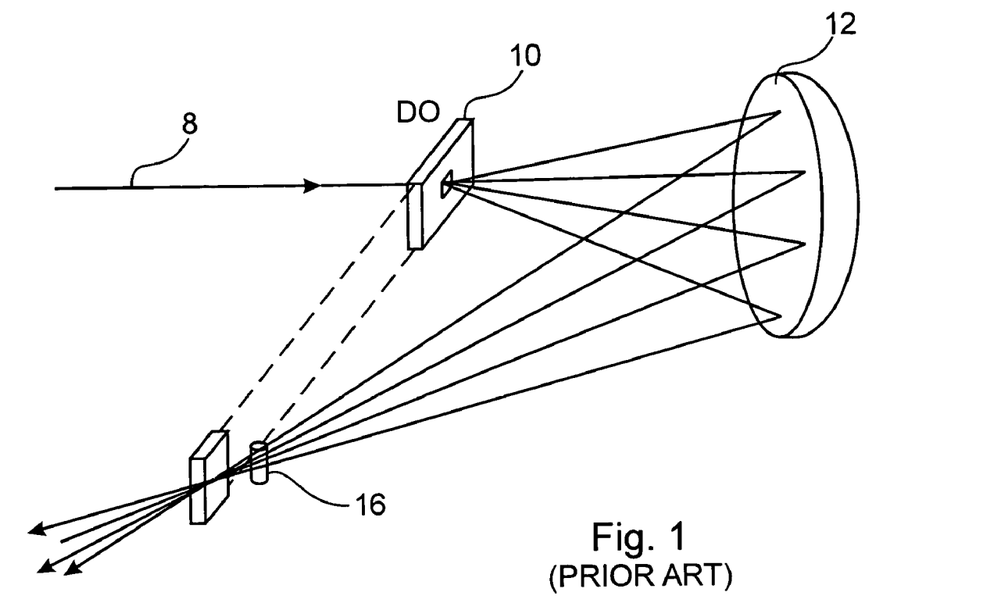
FIG. 1 is a prior art system for holographic imaging.

Referring to FIG. 1, the prior art of Miller et al. is shown. A femtosecond laser pulse 8 is incident on a diffractive element 10. The laser pulse 8 is diffracted and propagates to a curved mirror 12. The laser pulse is reflected and propagates into a lens 16. The laser pulse then propagates from the lens to the target.

Unfortunately, the technique taught by Miller is very sensitive to the alignment of the various optical components. The technique taught by Miller et al. is an interferometric technique. It incorporates a diffractive optic to split a beam to produce a plurality of beams. The optical pathlengths of the diffracted beams should be the same length within a tolerance corresponding to the physical presence of the electromagnetic radiation ie. approximately 30 µm for 125 femtosecond laser pulses. Although not impossible, it is often difficult to provide such highly accurate pathlengths, even with costly equipment. Consequently, when such a technique is used to produce a Bragg grating in an optical fiber even a small misalignment in any of the optical components almost certainly results in a poor grating. Indeed, the "pulse-to-pulse" stability of the optical system as taught by Miller et al. should be very consistent or the fringe contrast produced by the overlapping beams is "washed out". Indeed, small vibrations and air currents are sufficient to reduce the "pulse to pulse" stability in an optical system as taught by Miller et al. Additionally, the filtering characteristics such as apodization, chirp, and phase-shifts are difficult to image remotely. Therefore, it would be difficult to incorporate the teachings of Miller et al. in a system for producing Bragg grating structures in optical fiber.

As a person of skill in the art will be aware, the relatively short duration of a femtosecond laser pulse provides a laser pulse that is not monochromatic. Additionally, a person of skill in the art will be aware that a diffractive element, such as a phase mask, angularly deflects light according to the wavelength of the light. In U.S. Pat. No. 6,297,894 issued to Miller et al. beginning at column 2 line 49, states that, "Providing a hybrid technique of utilizing standard phase masking techniques in combination with using ultra short high power femto-second pulses is problematic, since close coupling a phase mask to create an interferometric pattern in a sample is not feasible; the mask will experience optical damage due to the high peak intensity of light required at the sample position. Hence . . . the mask must be located remotely . . . ". Embodiments of the invention presented hereinbelow demonstrate that the reasoning of Miller et al. need not be the case. Further, the prior art of Miller et al. states that remotely locating the phase mask will protect it from optical damage but will not produce interference fringes because of the dispersive spreading of the high spectral content ultra short laser pulse. Ultra short duration pulses of light having long wavelengths are known to have very high intensity and consequently it was reasoned that this type of pulse would damage a phase mask positioned in close proximity to a target of such a pulse.

Figure 2:
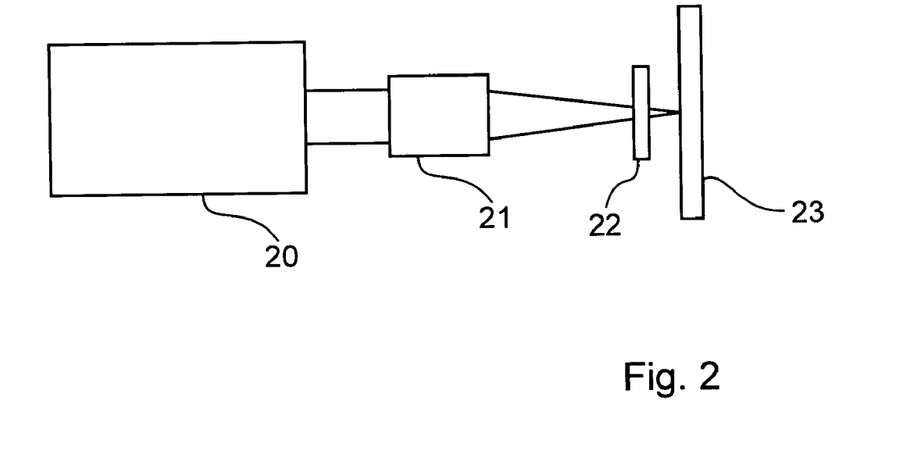
FIG. 2 is a diagram of a system according to an embodiment of the invention.

Referring to FIG. 2, a simplified diagram of an apparatus for producing fiber Bragg gratings (FBGs) according to an embodiment of the invention is shown. The apparatus comprises: a laser source 20 for providing ultra-short duration pulses of laser light; a cylindrical lens 21 for focusing the ultra-short duration pulses; a diffractive optical element 22; and, an optical waveguide 23 having a target portion 24. In use, the optical waveguide 23 is biased against a fixture and the target portion 24 of the optical waveguide 23 is stripped of any external jacket. The diffractive optical element 22 is positioned proximate and aligned with the target portion 24. When the laser source 20 is activated it emits an ultra-short duration pulse of laser light. The ultra-short duration pulse propagates from the laser source 20 to the cylindrical lens 21. The ultra-short duration pulse then propagates from the cylindrical lens 21 to the diffractive element 22. The diffracted ultra-short duration pulse of laser light then propagates into the optical fiber. As is well known to those of skill in the art, the intensity peaks of the interference fringe pattern are spatially oriented along a length of the optical fiber to cause periodic index changes within the fiber at predetermined intervals, thus forming a Bragg grating. Although this embodiment of the invention relies upon a cylindrical lens for focusing the ultra-short duration pulses of light this need not be the case. In an alternative embodiment of the invention, a focusing mirror is used to focus the ultra-short duration pulses of light instead of a cylindrical lens. This substitution would be apparent to one of skill in the art of optical design.

Figure 3A:
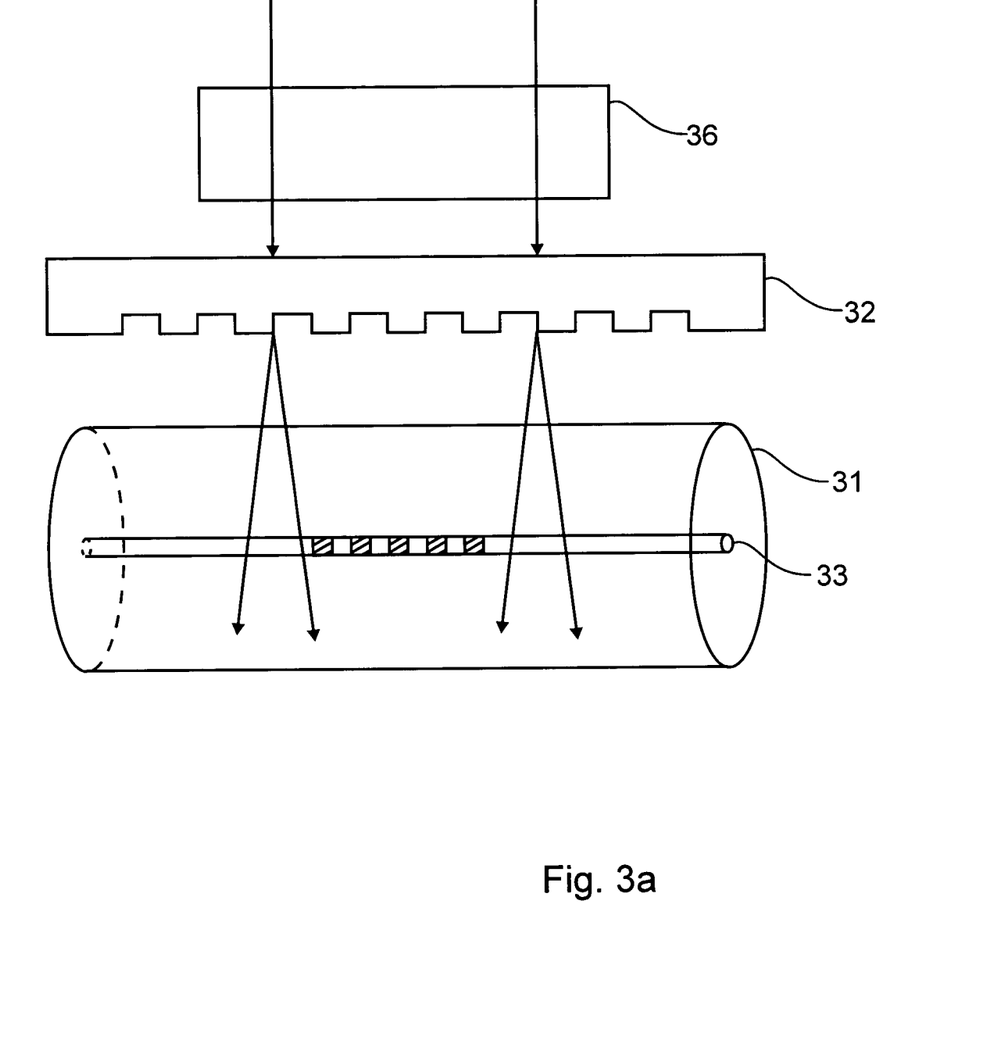
FIG. 3a is a representative top view of an optical fiber being written to using the apparatus of FIG. 2.

Referring to FIG. 3a, a top view diagram representative of a fiber receiving a pulse as described with reference to FIG. 2. FIG. 3a includes an optical fiber 31 having a waveguide core 33; a diffractive element 32 in the form of a phase mask; and a lens 36. The diagram clearly indicates that there are no focusing elements optically disposed between the diffractive element 32 and the optical fiber 31.

Figure 3B:
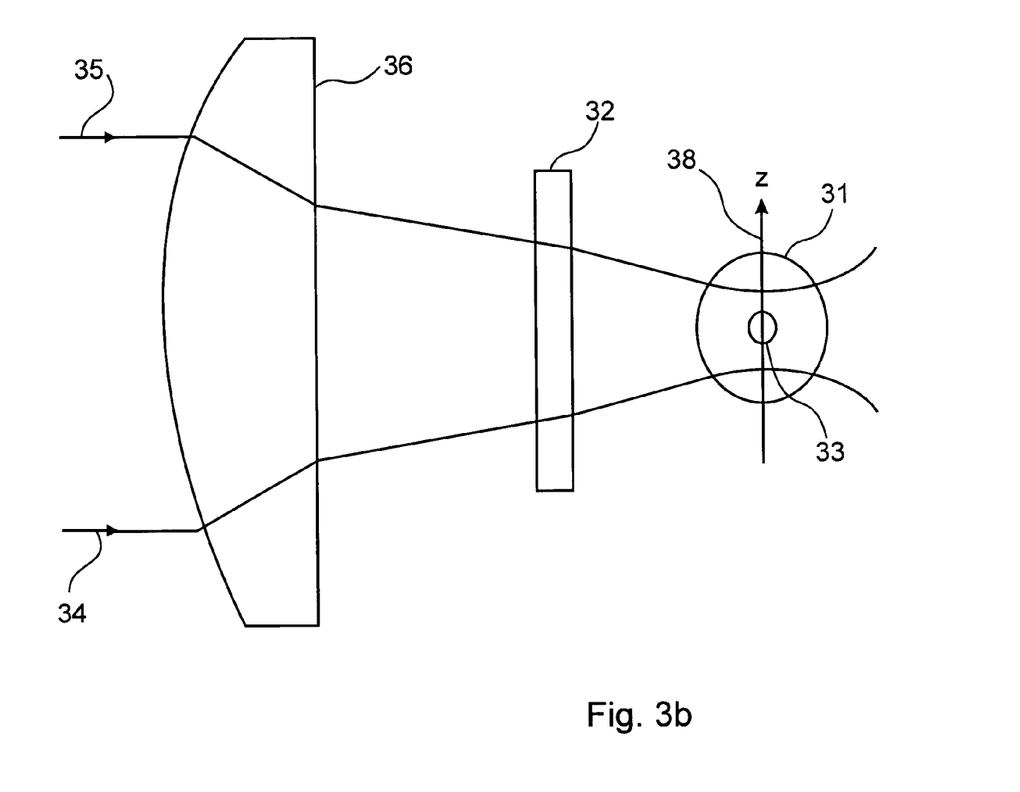
FIG. 3b is a representative side view of an optical fiber being written to using the apparatus of FIG. 2.

Referring to FIG. 3b, a side view of the components presented in FIG. 3a is shown. This diagram includes indications of rays 34 and 35 that are indicative of the extent of an optical pulse. The rays 34 and 35 are shown converging as they approach the diffractive element 32. The separation of the rays 34 and 35 within the diffractive element 32 is shown to be larger than their separation proximate the waveguide core 33. Thus, it is apparent that the maximum intensity of the light pulse is proximate the waveguide core 33. It should be noted that the rays are nearly symmetric about the axis 38. This near symmetry helps to maintain a low level of birefringence in the waveguide after the periodic index changes have been created in the optical fiber. In a preferred embodiment of the invention, the diffractive element 32 and the optical fiber 31 are silica and the focal spot size at the exit of the phase mask is larger than that in the core of the fiber. In the system according to the preferred embodiment the light pulse does not cause optical damage to the diffractive element 32 because the beam intensity is less than the damage threshold of the material of the diffractive element 32. When the exit beams, ie. those corresponding to ±1 order, produce the interference fringes, the high intensity portions of the fringe pattern are above the damage threshold of silica and therefore, induce a change in the index of refraction of the optical fiber 31.

As a person of skill in the art will be aware, the invention need not be limited to the writing of Bragg gratings within the waveguide core of an optical fiber. In some cases it is preferable to provide a tap by writing a grating within the cladding of the optical waveguide without providing a set of interference fringes in the core. A person of skill in the art will easily envision the modification of embodiments of the invention for use in a wide variety of applications. For example, the invention is equally applicable to planar waveguide structures and buried waveguide structures. This technique is also useable for producing to photoinduced index modulations in materials that are not waveguides, for example photoresist patterning, direct patterning of glasses, semiconductor materials, nonlinear crystalline materials such as $LiNO_3$. Such surface and volume holograms are optionally used for optical encoding and data storage. In U.S. Pat. No. 5,978,538 the creation of bulk waveguides in glasses, Bragg structures are optionally incorporated as the waveguide is being generated using a technique according to the invention. Similarly, optical taps are generated by writing a Bragg structure at an angle to the optical axis of a fiber to produce a radiation tap as described by Hill et al. in U.S. Pat. No. 6,385,369. Such gratings are well suited for use in an "eye safe" free space optical computer link modem, for example.

The invention, as described with reference to FIG. 2, improves on remote imprinting of interference fringes generated by the phase mask by using peak powers that are below the damage threshold of the phase mask and; below the threshold of supercontinuum generation that has been correlated with nonlinear self-focusing processes, which lead to damage. The intensity levels incident on the fiber waveguide that are required to create photoinduced index changes in Ge-doped fibers are not as high as previously thought as there seems to be preferential multi-photon absorption in the Ge-doped region as opposed to the undoped cladding. It is unclear if the preferential multiphotonic absorption in the core is due to the presence of the Ge dopant or is more generally due to a multiphotonic self-focusing process that is accentuated as a result of the step index change at the circular core cladding interface that is a lensing effect of the core. Embodiments of the invention featuring a silica phase mask permit the placement of the silica phase mask in close proximity to the target waveguide without damaging the silica phase mask, when laser intensities below the damage threshold of the silica are used. Thus, in an embodiment of the invention, the diffractive element is a silica phase mask. Indeed, the phase mask is optionally made of any material that is transmissive to the range of wavelengths of the ultra short duration pulse of laser light. Suitable materials include BK7 glass, soda lime glass, plastic, and UV transmissive glasses such as silica, calcium fluoride, and magnesium fluoride. Alternative embodiments of the invention feature a phase mask that is not transmissive to the incident ultra short duration pulse of laser light. For example, the phase mask is optionally a frequency doubling medium like a crystal with an antireflection coating in the infra red so that visible light from an ultra short duration pulse is generated in the phase mask and the generated light diffracted but the IR light is reflected.

In the embodiment of the invention shown in FIG. 2, the alignment of the various components is very important to ensure that a good quality Bragg grating is produced, however the process of aligning the components is relatively simple in comparison with the prior art of Miller et al. Specifically, the fiber is positioned proximate a predetermined position relative to a focusing point of the laser source 20 and cylindrical lens 21 combination. The diffractive element is positioned within the optical path of a laser pulse and at a predetermined distance from the optical fiber. The impact of the adversity of the angular dispersion of the diffracted beams as taught by Miller et al. is greatly reduced by disposing the silica glass phase grating mask adjacent and parallel to an optical medium. Since the beam intensity is also below the damage threshold of the phase mask, the mask need not be placed and aligned remotely as taught by Miller.

Figure 4A:
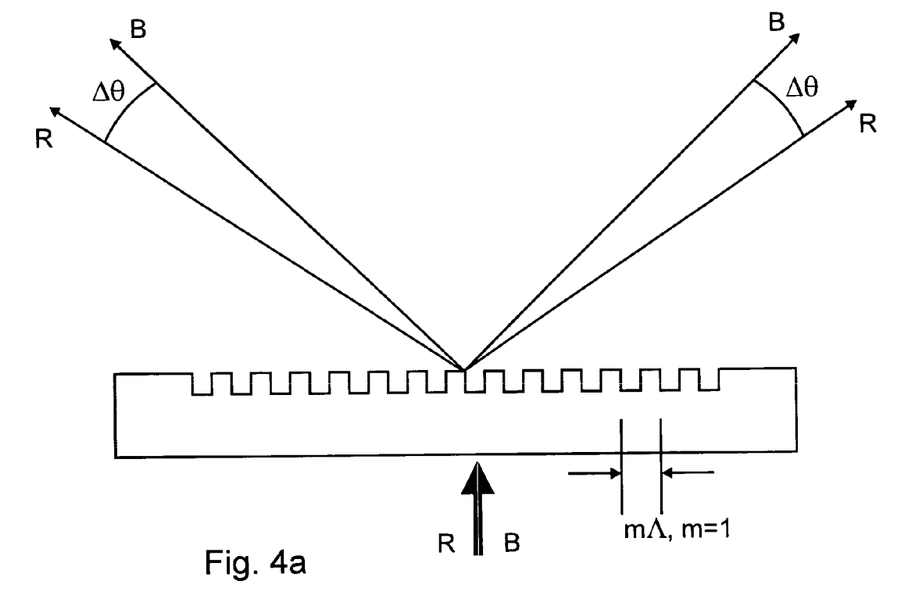
FIG. 4a is a diagram illustrating the response of a phase mask for producing a first order resonance Bragg grating in a target waveguide.
Figure 4B:
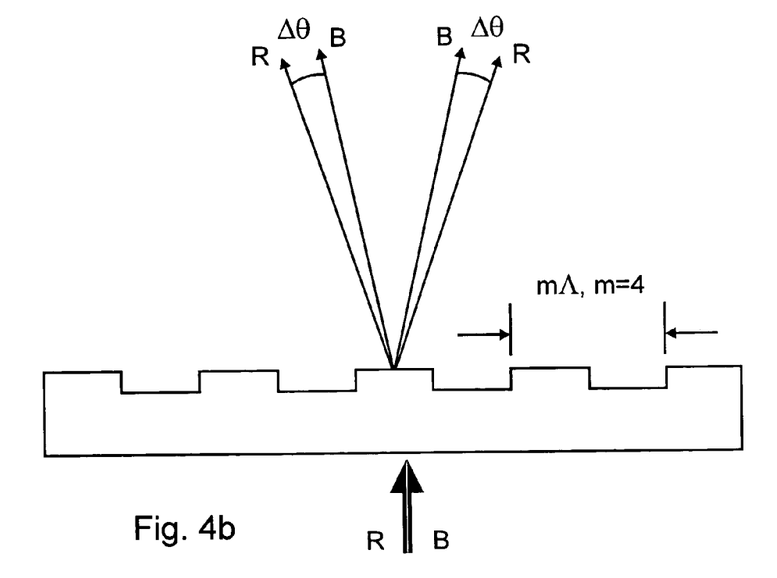
FIG. 4b is a diagram illustrating the response of a phase mask for producing a higher order resonance Bragg grating in a target waveguide.

Referring to FIG. 4a, a lowest order phase mask is shown. An optical beam incident the phase mask is dispersed upon interacting with the phase mask. Specific wavelengths of the light propagate from the phase mask at specific angles. Since a femtosecond laser pulse is not monochromatic it exhibits similar behaviour when it interacts with such a phase mask. Referring to FIG. 4b, the angular dispersion of a higher order phase mask is shown for an analogous optical beam. As shown, the higher order phase mask causes substantially less angular dispersion of the optical beam. Thus, in another embodiment of the invention consistent with FIG. 2 in which the diffractive optical element is a phase grating, a reduction in the adversity of angular dispersion of diffracted beams is achieved by selecting a phase grating used to spatially modulate a femtosecond beam with a pitch $$\text{Pitch} = m\lambda_{Bragg}/n_{Effective} \qquad \text{a.}$$

where $\lambda_{Bragg}$ is the desired resonant wavelength of retro-reflective intra-mode coupling in the fiber, $n_{Effective}$ is the effective index of the coupled modes at $\lambda_{Bragg}$ and m is the order number of the Bragg grating and m>1. For the purposes of this document, the desired resonant wavelength will also be referred to as the design wavelength. Because the photosensitive process is non-linear, imprinting a grating supporting higher order Bragg resonances is highly beneficial when such a grating is resonant at the Bragg resonance of interest. The fabrication of second order Bragg grating structures has been disclosed by Xie et al. Opt. Comm. 101, 85 (1993). If the phase mask is zero-order nulled, the induced pitch in the fiber is half that of the phase mask. If the phase mask is not precisely etched to produce a good zero-order nulling effect, the induced pitch in the fiber will be the same as the mask. Since higher order gratings are being used precise etch depth of the phase mask is not as critical.

Figure 5:
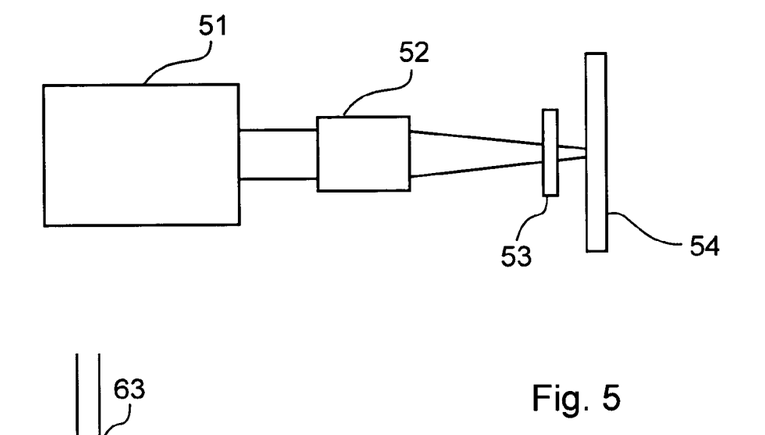
FIG. 5 is a diagram of a system according to an embodiment of the invention featuring a diffractive element in the form of a fourth order phase mask.

Referring to FIG. 5, an embodiment of the invention is shown featuring a fourth order phase mask. This embodiment includes a femtosecond laser source 51, a lens 52, a fourth order phase mask 53 and a target photosensitive material 54. In use, the femtosecond laser source 51 provides an optical pulse. The optical pulse propagates to the lens 52 that focuses the optical pulse. The optical pulse propagates to the fourth order phase mask 53 and is incident thereon. A portion of the optical pulse propagates from the fourth order phase mask 53 and is incident the target photosensitive material 54. The portion of the pulse incident the target photosensitive material 54 forms an interference fringe pattern therein. The peaks of the interference fringe pattern are sufficiently intense to cause a permanent change in the index of refraction in the target photosensitive material 54. This embodiment of the invention is highly advantageous because it permits a greater physical separation between the element used to diffract the laser pulse, in this case a fourth order phase mask 53, and the target photosensitive material 54. The increased separation is beneficial because it permits the formation of index changes deeper within the target photosensitive material 54. Additionally, increasing the separation of the phase mask and the target photosensitive material 54 has the beneficial effect of reducing the intensity of the laser pulse incident the phase mask, thereby permitting the use of a more powerful femtosecond laser. Tighter focusing of the optical pulse will also permit smaller focal spot sizes, less than the waveguide core, which will allow for fabrication for selective exposure of specific regions of the core. Alternatively, the fourth order phase mask 53 is kept in close proximity to the target photosensitive material 54 thereby further enhancing the sharpness of the peaks of the interference fringe pattern and consequently permitting the production of sharper interference fringes. In an alternative embodiment of the invention, a system is provided as described with reference to FIG. 5 however a waveguide is substituted for the photosensitive material. A person of skill in the art will be aware that using this technique, patterns are optionally written on a wide variety of target materials. Optionally, such target material includes an optical waveguide having a waveguide core layer.

Figure 6:
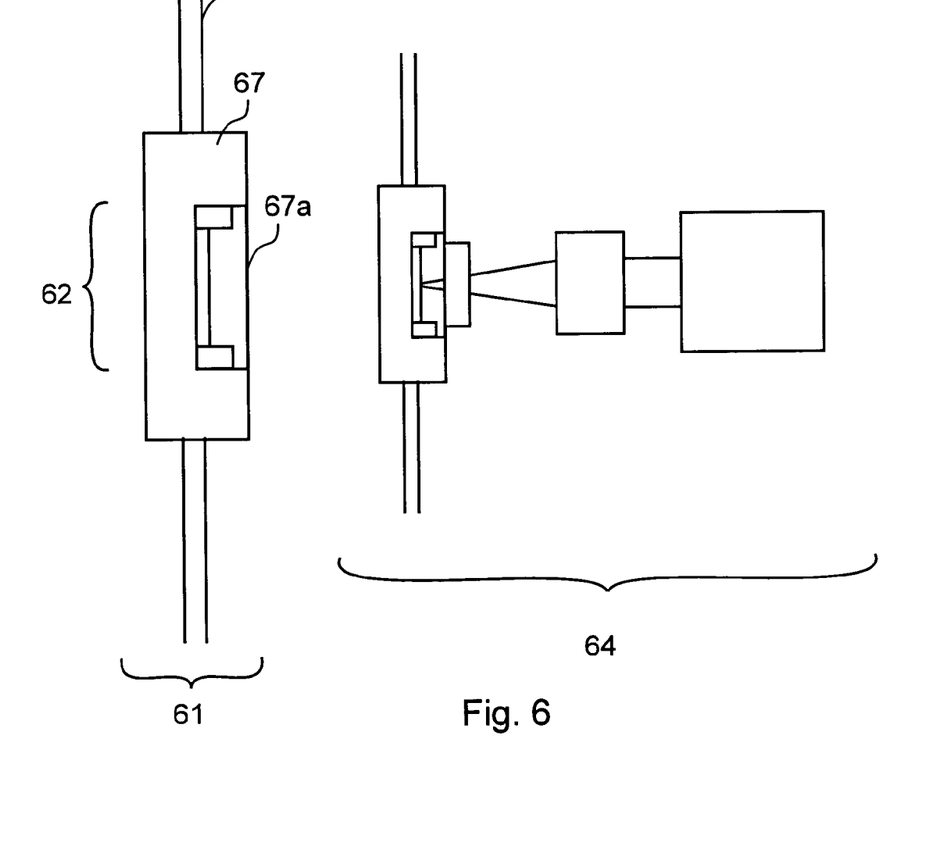
FIG. 6 is a production system according to an embodiment of the invention.

Clearly, the use of a higher order phase mask permits more variation in the physical positioning of the target waveguide when it receives a diffracted pulse. Referring to FIG. 6, a production system for producing FBGs according to another embodiment of the invention is shown. This embodiment of the invention is specifically intended to take advantage of the reduced tolerances of a system according to the invention. In a first stage 61 of the system 60, a portion 62 of an optical fiber 63 is stripped, exposing the cladding. The stripped portion 62 is disposed in a package 67. The package includes a transparent portion 67a. In a second stage 64, the stripped portion 62 is brought into close proximity with a diffractive optical element. The diffractive optical element receives a femtosecond pulse of laser light. The femtosecond pulse is diffracted and propagates through the transparent portion 67a and forms an interference pattern within stripped portion 62 of the optical fiber 63. The intensity peaks of the interference pattern are sufficiently intense to cause a permanent change in the index of refraction in the optical fiber 63. This production method is highly advantageous because it helps to protect the exposed optical fiber during processing. Additionally, it provides flexibility in that the first stage 61 is optionally performed at a first location while the second stage 65 is performed at a second location. Optionally, an opaque covering, such as paint, is applied to the transparent portion 67a.

Figure 7:
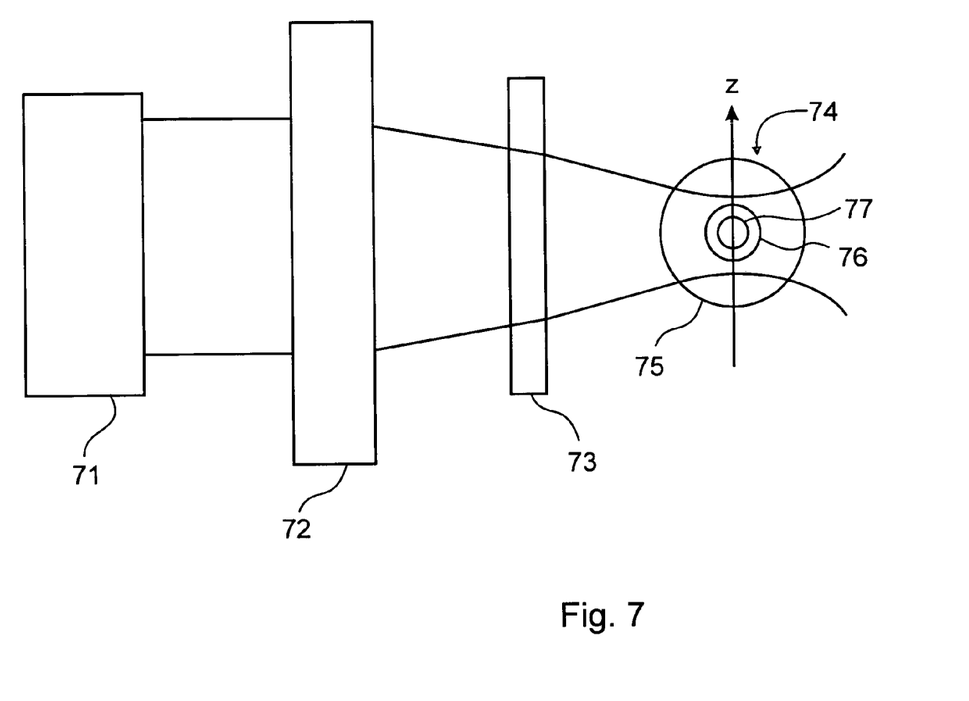
FIG. 7 is a diagram of a system according to an embodiment of the invention for writing gratings through a jacket of a waveguide; and, FIG. 8 is a diagram of a system according to an embodiment of the invention featuring a precision alignment stage.

Referring to FIG. 7, an apparatus for writing a Bragg grating into an optical fiber according to an embodiment of the invention is shown. The apparatus comprises a femtosecond laser source 71, a lens 72, a diffraction element 73, and a target waveguide 74. The target waveguide 74 includes a jacket 75, a cladding 76 and a waveguide core 77. The femtosecond laser source 71 provides pulses of laser light having a predetermined range of wavelengths. The material of the jacket 75 is transparent to this predetermined range of wavelengths. In use, the femto second laser source 71 provides a pulse of Laser light. The pulse of laser light propagates to the lens 72 that focuses the pulse of laser light. The pulse of laser light is incident a surface of the diffractive element 73. A portion of the pulse laser light propagates to the target waveguide 74 and is incident thereon. Since the jacket 75 is transparent to the range of wavelengths of the femtosecond laser source 71 the portion of the pulse of laser light penetrates the jacket 75 and forms an interference fringe pattern in the waveguide core 77. The intensity of the peaks of the interference fringe pattern is sufficient to cause a change in the index of refraction of the waveguide core 77. Thereby forming a Bragg grating. There are prior-art examples of fabrication of UV-induced fiber gratings where special polymer jackets are used that are transmissive to the UV-light. Aspell et al in U.S. Pat. No. 5,620,495 disclose a method of fabrication of UV-induced fiber Bragg gratings through a single UV-transmissive polymer coating while Starodubov in U.S. Pat. No. 6,222,973 teaches a similar method of UV-induced grating fabrication but with optical fiber being protected by a multi-layer polymer coating. In this embodiment of the invention no special polymer coating is required and standard coatings that are transmissive to the infrared radiation are used.

Figure 8:
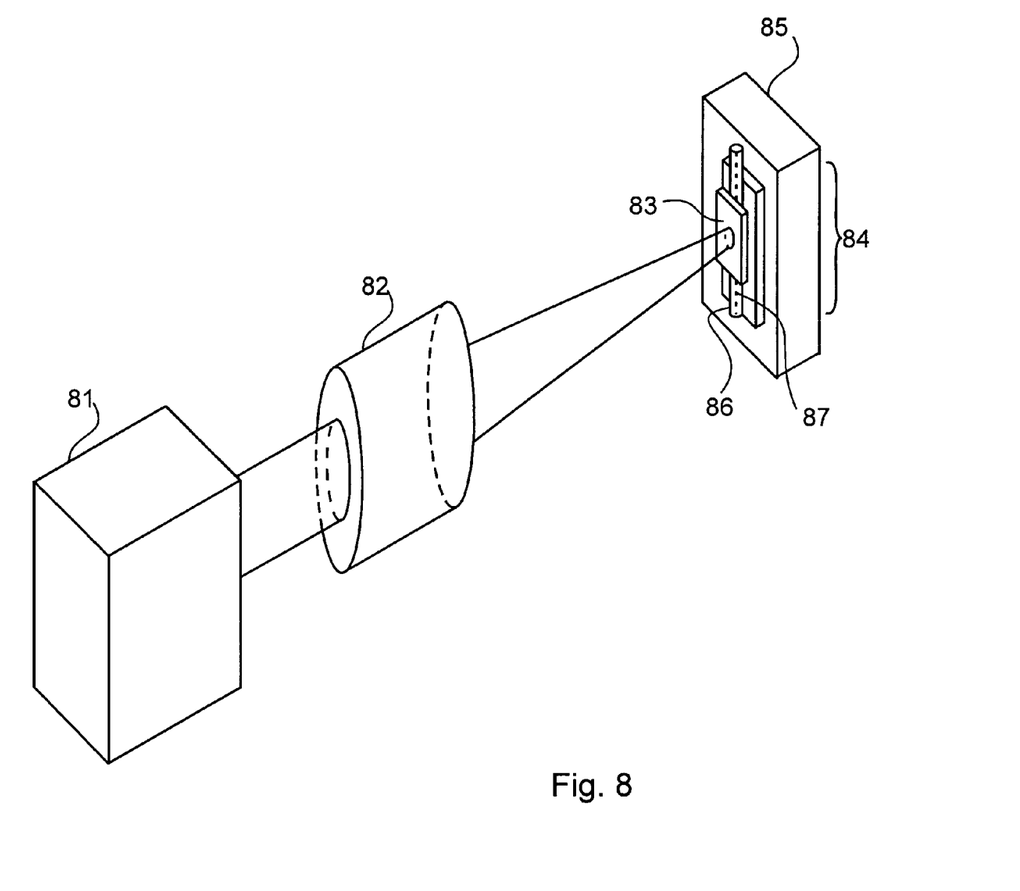

Referring to FIG. 8, another embodiment of the invention is shown. This embodiment comprises a femtosecond laser source 81, a lens 82, an amplitude mask 83, a target waveguide 84, and an alignment stage 85 supporting precision alignment. The target waveguide 84 includes a waveguide core 86 and a waveguide cladding 87. In use, the femtosecond laser source 81 provides a pulse of laser light. The pulse of laser light propagates to the lens 82 that focuses the pulse of laser light. The focused pulse of laser light is incident a surface of the amplitude mask 83. A portion of the pulse propagates to the target waveguide 84 and is incident thereon. The portion of the pulse forms an interference fringe pattern in the target waveguide 84. The intensity of the peaks of the interference fringe pattern is sufficient to cause a change in the index of refraction of the target waveguide 84. The alignment stage 85 is sufficiently precise to vary the location of the interference fringe pattern by setting the alignment stage 85 prior to producing pulses from the femtosecond laser source 81. Thus, in a first mode of operation a set of fringes corresponding to an interference fringe pattern is written into the waveguide core 86 and the waveguide cladding 87 of the target waveguide 84. In a second mode of operation a set of fringes is written to the waveguide cladding 87 absent writing fringes to the waveguide core 86. In a third mode of operation, the alignment stage provides an angle between the amplitude mask 83 and the waveguide core 86 thereby producing a grating that is blazed. In a fourth mode of operation, the focused pulse of laser light is incident a surface of the amplitude mask 83. A portion of the pulse propagates to the target waveguide 84 and is incident thereon. The portion of the pulse does not form an interference fringe pattern in the target waveguide 84 but instead produces an intensity modulation based on the binary output from the amplitude mask.

The embodiment of the invention described with reference to FIG. 8 is also highly beneficial because it supports a "step and repeat" production process. The step and repeat production process is useful in the production of very long fiber gratings. Such gratings are commonly used in wavelength dispersion compensation systems used in DWDM optical networks. The step and repeat production process is also useful for producing localized grating structures along a length of the fiber, such as sampled gratings. Other suitable applications will be apparent to one of skill in the art. A person of skill in the art will be aware that other embodiments of the invention such as, for example, the embodiment described with reference to FIG. 5 will also support a step and repeat process.

Due to the rapid but short-lived multi-photon ionization process, very high index variations are possible without prior sensitization of the fibers or waveguides with, for example, hydrogen or deuterium. In addition, the highly localized index changes produced by the interference fringes from the phase mask are similar to single shot damage gratings in that the refractive index change is permanent up to the glass transition temperature of the fiber. Thus, in a process according to the invention, high spectral quality gratings with very high index modulations are easily produced. Beneficially, these gratings are also robust at high temperatures. Such a process need not include a step of photosensitization of the fiber nor a step of removal of the fiber jacket. These advantages make such a process particularly well suited to high volume manufacturing as it reduces the need for additional processing steps. Additionally, since the index changes produced are relatively high a very high quality Bragg grating is produced.

A wide variety of alternative embodiments of the invention are easily envisioned by a person of skill in the art. For example, other embodiments of the invention feature an amplitude mask instead of a diffractive optical element. If the amplitude mask is provided sufficiently close to the target waveguide then a grating is produced absent diffraction of the electromagnetic radiation.

Numerous other embodiments of the invention will be apparent to one of skill in the art without departing from the spirit and scope of the invention. For example, a person of skill in the art will be aware that the technique according to the invention is optionally combined with the teachings of Miura et al. in U.S. Pat. No. 5,978,538, and Dugan et al. in US Patent Application No. 20030035640. Miura et al. teach the writing of waveguide in bulk glasses while Dugan et al. teach the modification or trimming of existing waveguide structures with ultrafast radiation. Specifically, the techniques taught by the invention, and the techniques of Miura et al. are optionally combined to provide a Bragg grating in a photosensitive material. For example, it is known to use sapphire fiber for high power beam delivery in industrial and medical applications. Typically the fibers are multimode with core diameters no smaller than 150 microns. Since this fiber is typically a single crystal, it is extremely difficult to draw it down to a 5 micron diameter where it would act as a single mode fiber. Since the sapphire fiber has a very high glass transition temperature (2000° C.) it has sometimes been used for high temperature sensing applications. Using a phase mask according to the techniques described with reference to the invention in combination with the method of Miura et al, a refractive index induced core is optionally written in the center and along the length of the sapphire fiber. The resulting device provides a high temperature stress-temperature sensor based on retro-reflecting Bragg gratings. There are similar fiber grating sensors in standard fiber that are used at lower temperatures in the oil and gas industry. This new sensor is optionally incorporated into smart skin structures that are exposed to high temperatures, for example the Space Shuttle.

What is claimed is:

1. A method for inducing a spatially modulated refractive index pattern in an optical waveguide, comprising:

providing an optical waveguide;

disposing a mask optically proximate the optical waveguide, the mask having a characteristic period; and, providing electromagnetic radiation on a surface of the mask, the electromagnetic radiation having a wavelength range, wherein the wavelength range of the electromagnetic radiation corresponds to the wavelength range from 10 nanometers to 15 microns, the electromagnetic radiation having a pulse duration of less than or equal to 500 picoseconds, the mask disposed to permit a portion of the electromagnetic radiation to interact with the mask and be incident on the optical waveguide, the interaction of the electromagnetic radiation with the mask for producing a spatial intensity modulation pattern within the optical waveguide, the electromagnetic radiation incident on the optical waveguide being sufficiently intense to cause a permanent change in an index of refraction of the optical waveguide, the electromagnetic radiation interacting with the surface of the mask having a sufficiently low intensity to not significantly alter produced spatial intensity modulation properties of the mask, the mask disposed relative to the optical waveguide such that a portion of the provided electromagnetic radiation produces more than two diffracted orders thereby resulting in a multiple beam interference field within the optical waveguide providing a field pattern thereby inducing a permanent index change in the optical waveguide, the permanent index change in the waveguide having a characteristic period greater than half that of the mask.

2. A method according to claim 1, comprising providing a laser source, the laser source for providing the electromagnetic radiation, wherein a focusing element is optically disposed between the laser source and the mask, the focusing element for focusing electromagnetic radiation provided by the laser source to a region optically proximate the surface of the mask such that said electromagnetic radiation does not significantly alter the spatial intensity modulation properties of the mask.

3. A method according to claim 1, wherein the mask is at least one of: a diffractive optical element, an amplitude mask, and a reflection diffraction grating.

4. A method according to claim 1, wherein the mask is a phase mask.

5. A method according to claim 4, wherein the phase mask is for use as an interferometer optically proximate the optical waveguide such that light incident upon the mask is transmitted directly into said optical waveguide, said phase mask having a corrugation period such that interference pattern producing said spatially modulated refractive index pattern in said optical waveguide has a Bragg resonance that is a high order Bragg resonance, said corrugation period producing diffracted beams with lower angular dispersion and stronger nullification of zero-order transmission than that produced with a smaller corrugation period for producing a spatially modulated refractive index pattern in said optical waveguide that has a fundamental Bragg resonance.

6. A method according to claim 1, wherein the method comprises photosensitization of the optical waveguide prior to exposure to electromagnetic radiation, wherein the electromagnetic radiation has a wavelength corresponding to infrared light and, wherein photosensitization of the optical waveguide comprises exposing the optical waveguide to one of hydrogen and deuterium gas.

7. A method according to claim 1, wherein the optical waveguide is an optical fiber.

8. A method according to claim 7, wherein the optical fiber comprises an external jacket layer and wherein in providing electromagnetic radiation, the portion of the electromagnetic radiation propagates from the diffractive optical element through the external jacket layer.

9. A method according to claim 1, wherein the optical waveguide is a crystal structure.

10. A method according to claim 9, wherein the crystal structure is a sapphire optical fiber, the sapphire optical fiber having an induced index change for providing a single-mode core, the single-mode core for propagating electromagnetic radiation at a design wavelength.

11. A method for inducing a spatially modulated refractive index pattern in a photosensitive material, comprising:

providing a photosensitive material;
disposing a mask optically proximate the photosensitive material, the mask having a characteristic period; and,
providing electromagnetic radiation on a surface of the mask, the electromagnetic radiation having a wavelength range, wherein the wavelength range of the electromagnetic radiation corresponds to the wavelength range from 10 nanometers to 15 microns the electromagnetic radiation having a pulse duration of less than or equal to 500 picoseconds, the mask disposed to permit a portion of the electromagnetic radiation to interact with the mask and be incident on the photosensitive material, the interaction of the electromagnetic radiation with the mask for producing a spatial intensity modulation pattern within the photosensitive material, the spatial intensity modulation pattern having a characteristic period greater than half that of the mask, the mask disposed relative to the photosensitive material such that a portion of the provided electromagnetic radiation produces more than two diffracted orders thereby resulting in a multiple beam interference field within the photosensitive material providing a field pattern thereby inducing a permanent index change in the photosensitive material, the electromagnetic radiation incident on the photosensitive material being sufficiently intense to cause a change in an index of refraction of the photosensitive material, the electromagnetic radiation interacting with the surface of the mask having a sufficiently low intensity to not significantly alter produced spatial intensity modulation properties of the mask.

12. A method according to claim 11, comprising: providing a laser source for providing the electromagnetic radiation; and, providing a focusing element optically disposed between the laser source and the mask, the focusing element for focusing electromagnetic radiation provided by the laser source to a region optically proximate the first surface of the mask such that said electromagnetic radiation does not significantly alter the spatial intensity modulation properties of the mask.

13. A method according to claim 11, wherein the mask is at least one of: a diffractive optical element, a phase mask, an amplitude mask, and a reflection diffraction grating.

14. A method according to claim 11, wherein the method comprises photosensitization of the photosensitive material prior to exposure to electromagnetic radiation, wherein photosensitization of the photosensitive material comprises exposing the photosensitive material to one of hydrogen and deuterium gas, and wherein the electromagnetic radiation has a wavelength corresponding to infrared light.

* * * * *